United States Patent [19]

Safonov

[11] Patent Number: 5,701,490
[45] Date of Patent: Dec. 23, 1997

[54] METHOD AND APPARATUS FOR COMPILER SYMBOL TABLE ORGANIZATION WITH NO LOOKUP IN SEMANTIC ANALYSIS

[75] Inventor: Vladimir Olegovich Safonov, St. Petersburg, Russian Federation

[73] Assignee: Sun Microsystems, Inc., Palo Alto, Calif.

[21] Appl. No.: 585,805

[22] Filed: Jan. 16, 1996

[51] Int. Cl.$^6$ .................................................. G06F 9/45
[52] U.S. Cl. ................................. 395/705; 395/708
[58] Field of Search ................................. 395/705, 708

[56] References Cited

U.S. PATENT DOCUMENTS

| | | | |
|---|---|---|---|
| 4,667,290 | 5/1987 | Goss et al. | 364/300 |
| 5,276,880 | 1/1994 | Platoff et al. | 395/700 |
| 5,361,351 | 11/1994 | Lenkov et al. | 395/700 |

OTHER PUBLICATIONS

"Compilers: Principles, Techniques and Tools", Aho et al., Addison–Wesley, 1988, Chapter 4.

"A new efficient incremental evaluator for attribute grammars": Naini M., Southeastcon, 1988, pp. 386–390.

"Source Encoding Using Syntactic Information Source Models", Robert D. Cameron, IEEE Trans. on Information Theory, 1988, pp. 843–850.

Primary Examiner—Alvin E. Oberley
Assistant Examiner—Kakali Chaki
Attorney, Agent, or Firm—Graham & James LLP

[57] ABSTRACT

A method and apparatus for compiling a source program to yield an object program. A syntactical analyzer stores pointers into an ID table into a parse tree instead of storing identifier names in the parse tree. The ID table has a Current Effective Definition (CED) for each identifier that changes as various blocks of the source program are entered and exited. The CED always points to a location in the symbol table where information about the current definition of the identifier is stored. A syntactical analyzer in the compiler uses the information stored in the parse tree to avoid searching the symbol table.

12 Claims, 11 Drawing Sheets

Attributed Syntax Tree
for an assignment

VAR x: real;

x := 2 *3

Semantic Attribute Routine

METHOD AND APPARATUS FOR COMPILER SYMBOL TABLE ORGANIZATION WITH NO LOOKUP IN SEMANTIC ANALYSIS

RELATED APPLICATIONS

The following applications, which are filed concurrently herewith, are related to the subject application, and are expressly incorporated by reference.

1) Application Ser. No. 08/586,234 of Vladimir O. Safonov entitled "Method and Apparatus for Efficient Evaluation of Semantic attributes in LALR Parsing" filed Mar. 22, 1996.
2) Application Ser. No. 08/586,338 of Vladimir O. Safonov entitled "TIP Technology and Its Application to SPARCcompiler Pascal" filed Jan. 30, 1996.
3) Application Ser. No. 08/585,815 of Vladimir O. Safonov entitled "Method and Apparatus for Records Fields Usage Checking at Compile Time" filed Jan. 16, 1996.

BACKGROUND OF THE INVENTION

This application relates to a compiler for a high level computer programming language and, specifically, to a method and apparatus for implementing a symbol table that allows fast access to identifiers in the symbol table.

A compiler is a computer program that translates a "source program" written in a high level computer programming language that is easily understood by human beings into a "target program" executable by a computer. Typically, a compiler includes several functional parts. For example, a conventional compiler may include a lexical analyzer that looks at the source program and identifies successive "tokens" in the source program.

A conventional compiler also includes a parser/syntactical analyzer, which takes as an input a grammar defining the language being compiled and a series of actions associated with the grammar. The syntactical analyzer builds a "parse tree" for the statements in the source program in accordance with the grammar productions and actions. For each statement in the input source program, the syntactical analyzer generates a parse tree of the source input in a recursive, "bottom-up" manner in accordance with relevant productions and actions in the grammar. Thus, the parse tree is formed of nodes corresponding to one or more grammar productions. Generation of the parse tree allows the syntactical analyzer to determine whether the parts of the source program comply with the grammar. If not, the syntactical analyzer generates an error. Thus, the syntactical analyzer performs syntactical checking, but does not conventionally check the meaning ("the semantics") of the source program. One example of a conventional parsing technique is a LALR (lookahead, left right) syntactical analyzer, which is described in Chapter 4 of the treatise "Compilers: Principles, Techniques and Tools" by Aho, Sethi, and Ullman, the entirety of which is hereby incorporated by reference.

Conventional syntactical analyzers also create a "Name List table" (an NL table) (also called a "symbol table") that keeps track of information concerning each identifier declared or defined in the source program. This information includes the name and type of each identifier. This information includes the name and type of each identifier, its class (variable, constant, procedure, etc.), nesting level of the block where declared, and other information more specific to the class.

In conventional compilers, after the source program is parsed, it is input to a semantic analyzer, which checks for semantic errors, such as the mismatching of types, etc. The semantic analyzer accesses the NL table to perform semantic checking involving identifiers. After semantic checking, the compiler generates intermediate code, optimizes the intermediate code, and generates a target program.

It is important that compilers execute quickly and efficiently. In conventional compilers, the design of the semantic analyzer leads to inefficiencies of operation. Specifically, in conventional compilers, the semantic analyzer must perform an NL table lookup each time it performs a semantic check involving an identifier. A linear search performed on the NL table requires, on the average, N2 steps, where N is the total number of identifiers in the NL table. In other conventional compilers, the NL table is hashed into H lists, resulting in an average of N/(2*H) search operations. Searching the NL table is a very common operation during semantic analysis and improvement in the speed of access for NL table entries would lead to improvement in the overall operation of the compiler.

SUMMARY OF THE INVENTION

The present invention overcomes the problems and disadvantages of the prior art by implementing an improved organization for and way of accessing the NL table.

Instead of storing an identifier name in the parse tree and then searching the NL table for the identifier name during semantic analysis, the syntactical analyzer stores a pointer to an entry in an ID table. This table contains the symbols of the identifiers (each identifier has a unique ID table entry). The entry in the ID table contains a Current Effective Definition (CED) field that points to a current definition for the identifier in the NL table. The ID table is created by the lexical analyzer as it passes tokens to syntactical analyzer 114.

For each block in the source program, the invention maintains a "local definition list" of identifiers that have been declared or defined within the block. The invention modifies the CED fields of the ID table as blocks are entered and exited and as identifiers are declared so that the CED fields points to the current definition of each variable. A display list keeps track of the identifiers declared in each block. The current block or level of the source program is referred to as the "scope" of the source program.

Once the ID table and the NL table have been created and pointers to the ID table have been stored in the parse tree, the semantic analyzer can access the NL table without doing any searching. The semantic analyzer merely uses the pointer to the ID table to obtain a Current Effective Definition pointer into the NL table. The display list and the local definition list for each block ensures that the CED pointer in the ID table points to a current definition for each identifier. In a preferred embodiment, a pointer to the ID table is stored in the parse tree.

In accordance with the purpose of the invention, as embodied and broadly described herein, the invention is a method of compiling a source program, comprising the steps, performed by a data processing system having a memory, of; inputting the source program; generating a parse tree node for the source program in the memory; storing in the parse tree node a pointer into an ID table in memory that contains a pointer to an NL table entry for an identifier in the source program; and performing a semantic analysis of the source program using the pointer stored in the parse tree node.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
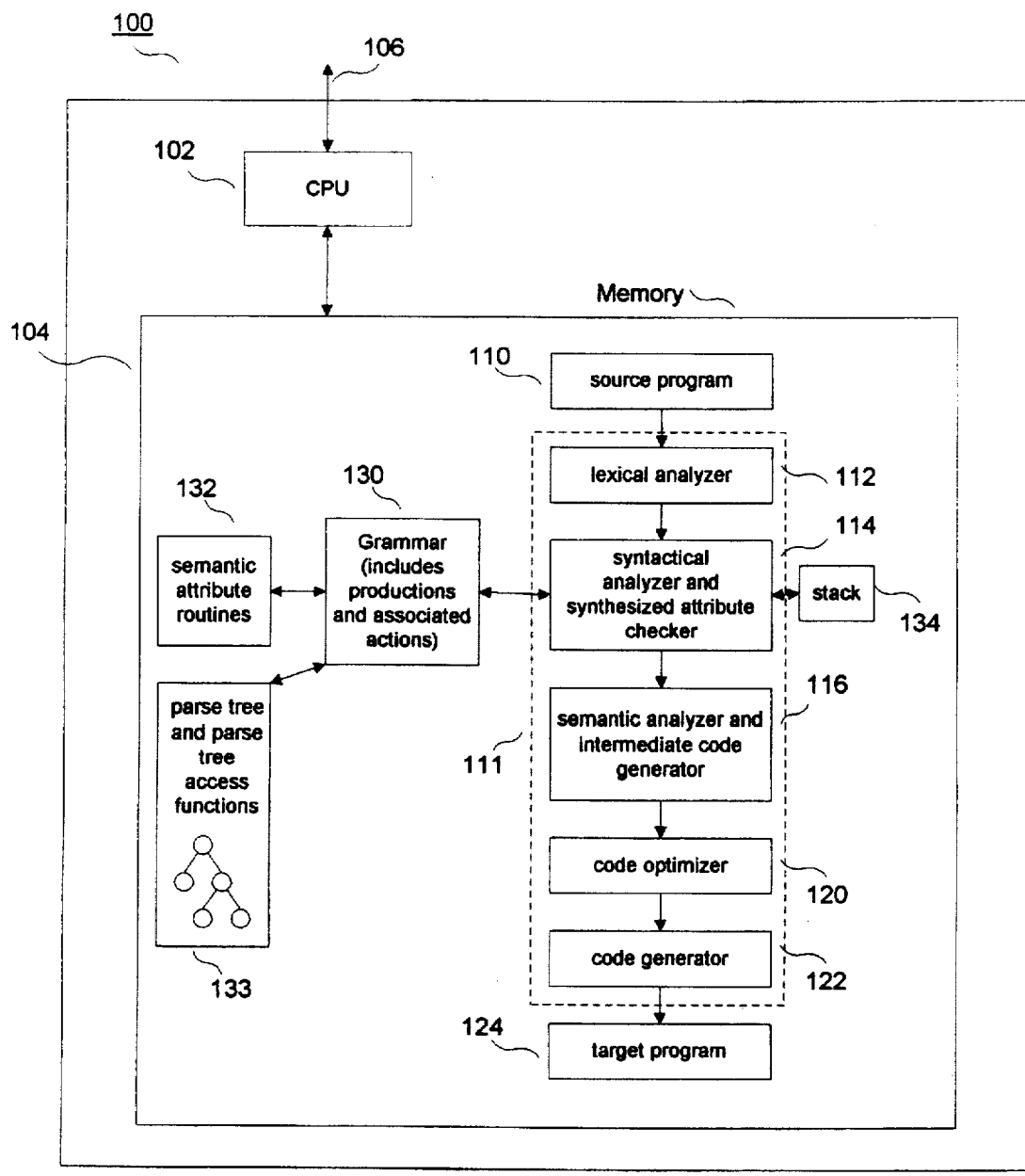
FIG. 1 is a block diagram of a computer system in accordance with a preferred embodiment of the present invention.

FIG. 1 is a block diagram of a computer system 100 in accordance with the present invention. Computer system 100 includes a CPU 102, a memory 104, and input/output lines 106. It will be understood by persons of ordinary skill in the art that computer system 100 can also include numerous elements not shown in the Figure for the sake of clarity, such as disk drives, keyboards, display devices, network connections, additional memory busses, additional CPUs, etc.

Memory 104 includes a source program 110, a compiler 111, and a target program 124. Compiler 111 includes a lexical analyzer 112, a syntactical analyzer 114, a semantic analyzer 116, a code optimizer 120 (optional), and a code generator 122. Compiler 111 inputs source program 110 and processes the source program to output target program 124. Compiler elements 112–116 operate for each statement in source program 110 to generate intermediate code.

As will be understood by a person of ordinary skill in the art, all parts of compiler 111 are embodied as instructions stored in memory 104 and performed by CPU 102. Syntactical analyzer 114 generates and accesses the parse tree 133 by using parse tree access functions 134. Semantic analyzer 116 recursively traverses the parse tree 133 for the entire source program created by syntactical analyzer 114, calling appropriate semantic analysis routines.

Semantic analyzer 116 prints error messages and/or halts execution if semantic errors are found. If no semantic errors are found, semantic analyzer 116 outputs PCC trees in a manner known to persons of ordinary skill in the art. Intermediate code generator 116 translates the PCC trees into a front-end representation in a manner known to persons of ordinary skill in the art (e.g., Aho et al., "Compilers, Principles, Techniques and Tools," pp. 735–737). In a first preferred embodiment of the present invention (a multi-pass compiler) syntactical analysis and semantic analysis are performed separately in respective passes. In a second preferred embodiment of the present invention, performance of parsing and semantic analysis are intermixed.

Code optimizer 120 (optional) optimizes this representation and outputs the front-representation in optimized form (for example, unused code fragments may be deleted). Code generator 122 preferably translates the front-end representation into target program 124 in a manner known to persons of ordinary skill in the art.

Memory 104 also contains data structures, including an NL table, an ID table, a plurality of local definition lists, and a global display list, each of which is discussed below in detail.

Figure 2A:
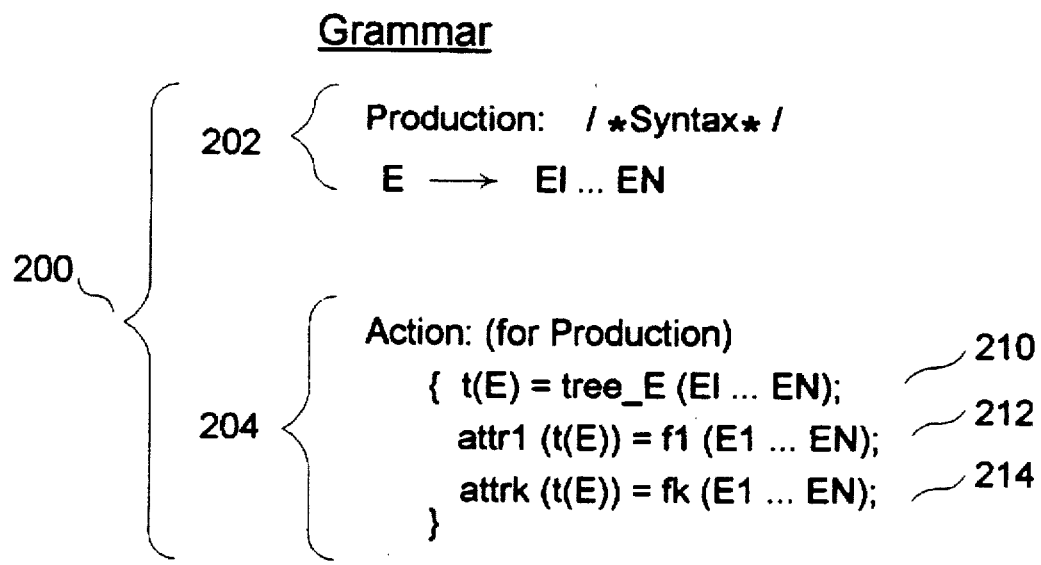
FIGS. 2(a)–2(b) show a format of data structures stored in a memory of FIG. 1, where the data structures include an ID table, an NL table, and a parse tree.
Figure 2B:
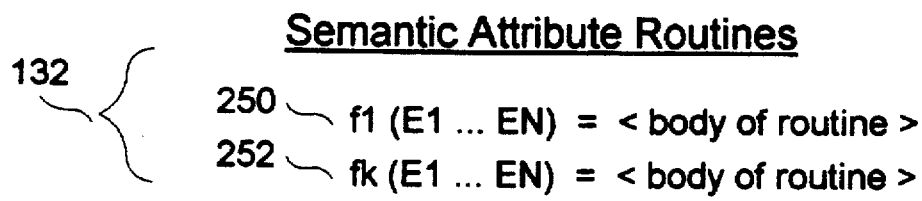

FIG. 2 shows a format of data structures 130 stored in a memory of FIG. 1, where the data structures include an ID table 202, an NL table 204, and parse tree 133. These data structures allow semantic analyzer 116 to reference identifier information from the NL table without having to perform a search of the NL table. Parse tree 133 is generated for the following source code 201:

VAR a: integer;

a:=0;

Thus, a node 210 of parse tree 133 corresponds to the variable "a". Node 210 includes a pointer 212 that points to an ID table entry 220 for the identifier "a". The name of pointer field 212 in parse tree node 210 is "CPTR".

The following paragraphs describe the formats of ID table 202 and NL table 204. ID table 202 includes an entry for each identifier used in source program 110. Each entry in ID table 202 preferably has two fields: an identifier field 222 containing the name of an identifier (e.g., "a") and an ID_NL field 224 containing a pointer to a Current Effective Definition (CED) of the identifier in the NL table. The value of ID_NL field 224 may change, depending on the current block of the source program that is being compiled.

NL table 204 includes an entry for each identifier declared or defined in each block of source program 110. Each entry 230 in NL table 204 preferably has at least five fields: 1) a field 232 indicating whether the identifier is a variable ("VAR") or a constant; 2) an NL_ID field 234 containing a backwards pointer to a corresponding entry 220 in ID table 202; 3) an NL_PREV field 236 containing a pointer to the previous definition of the identifier in an outer block (if any) or a NIL pointer; 4) an NL_NXTLOC field 238 containing a pointer to the next entry in a "local definitions list" for the current block; and 5) a type field 239 indicating a type of the identifier (e.g., "integer"). It will be understood by persons of ordinary skill in the art that entry 230 in NL table 204 also may contain other fields containing identifier information. These fields are not discussed herein for the sake of clarity of example.

Figure 3:
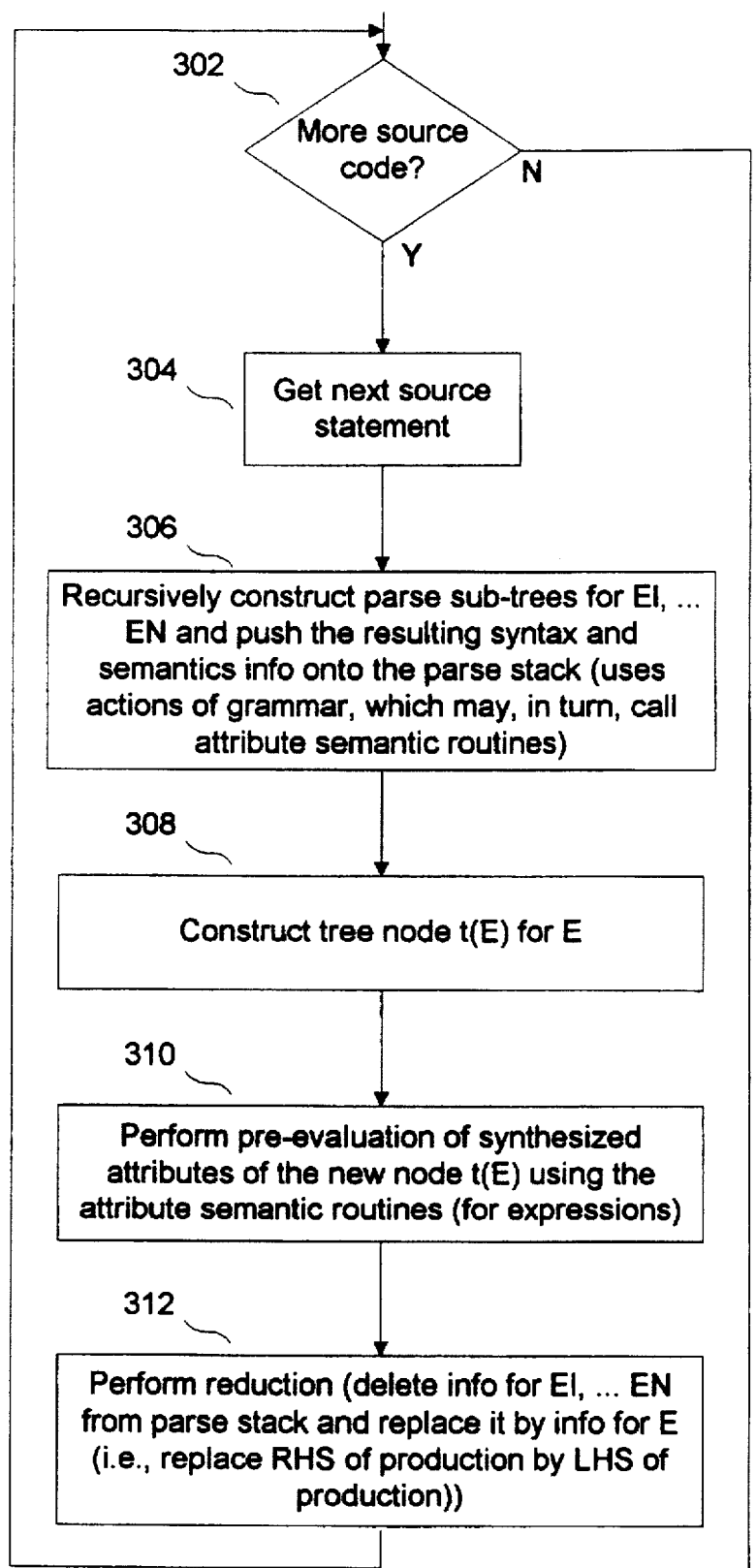
FIG. 3 is a flow chart showing steps performed to create the data structures of FIG. 2.
Figure 4:
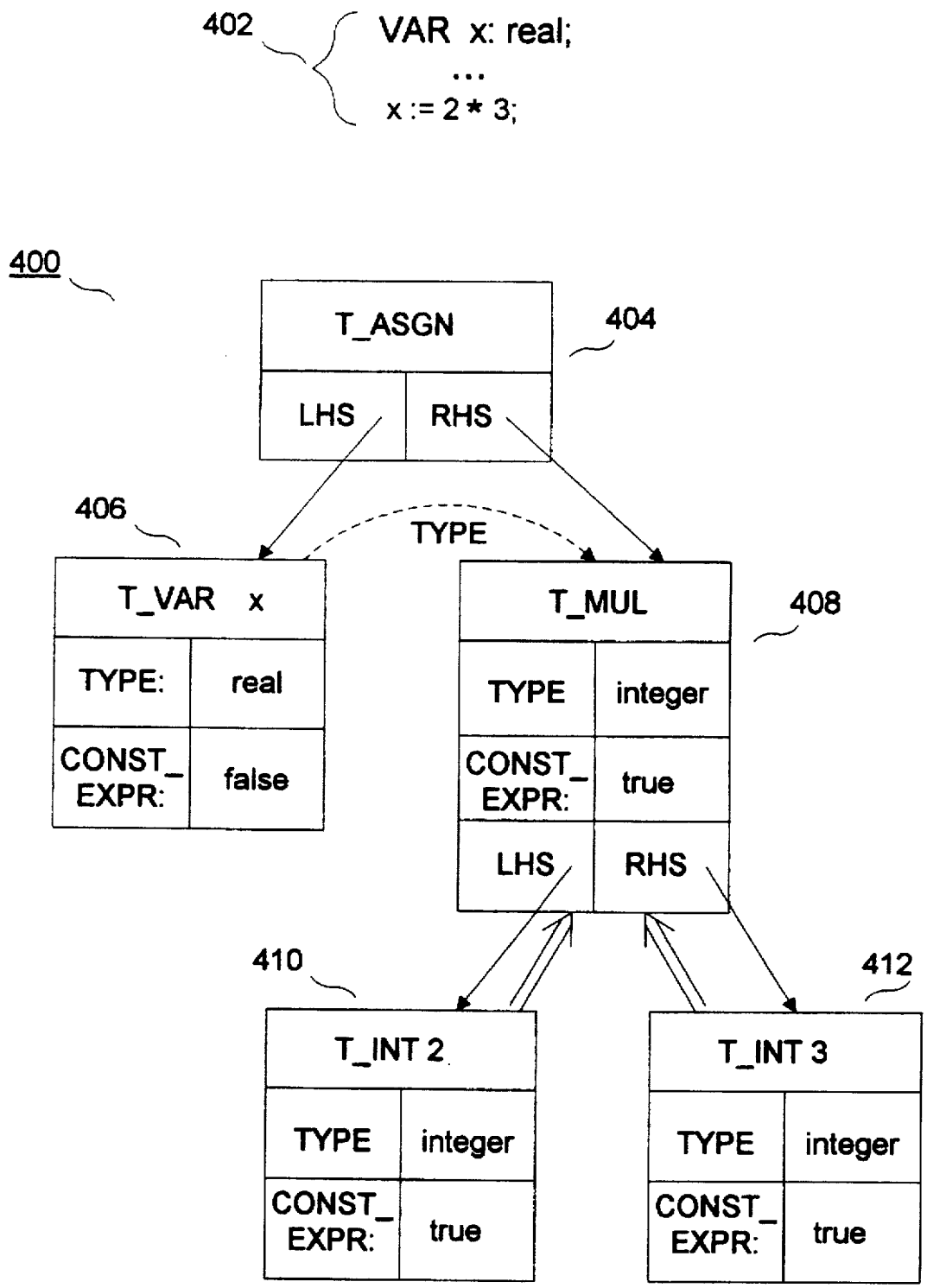
FIG. 4 is a flow chart showing additional steps performed to create the data structures of FIGS. 2(a)–2(b).
Figure 5A:
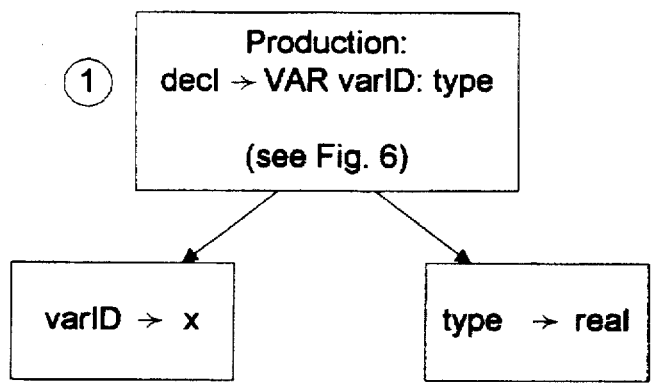
FIGS. 5(a)–5(b) show an example of the contents of the data structures of FIGS. 2(a)–2(b) during parse tree construction.
Figure 5B:
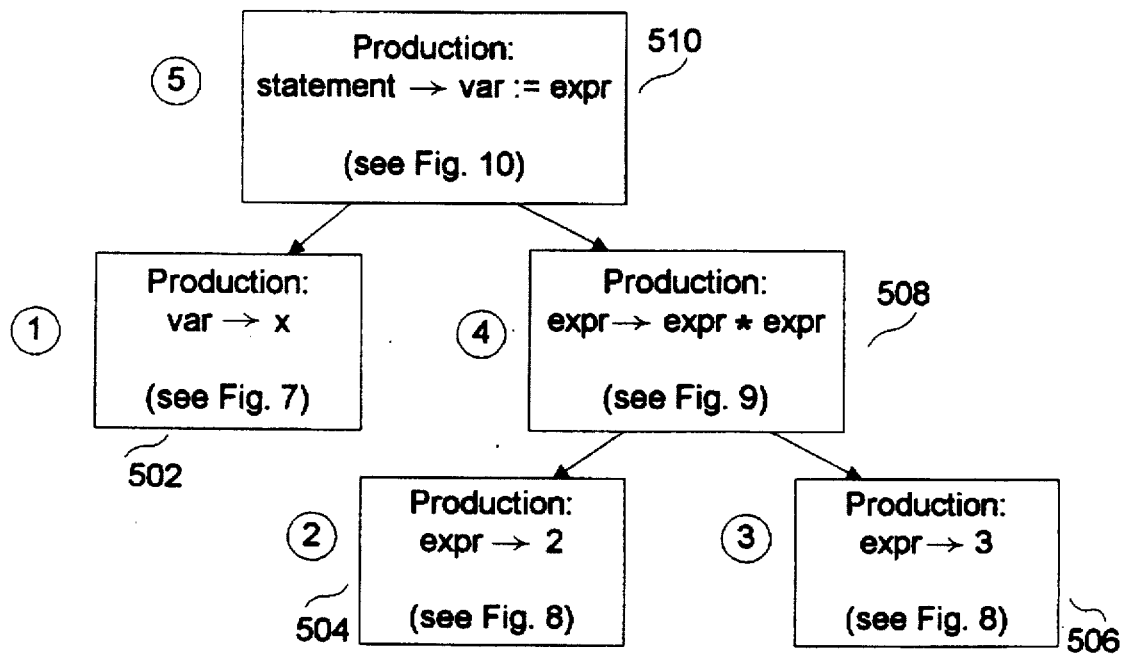
Figure 6:
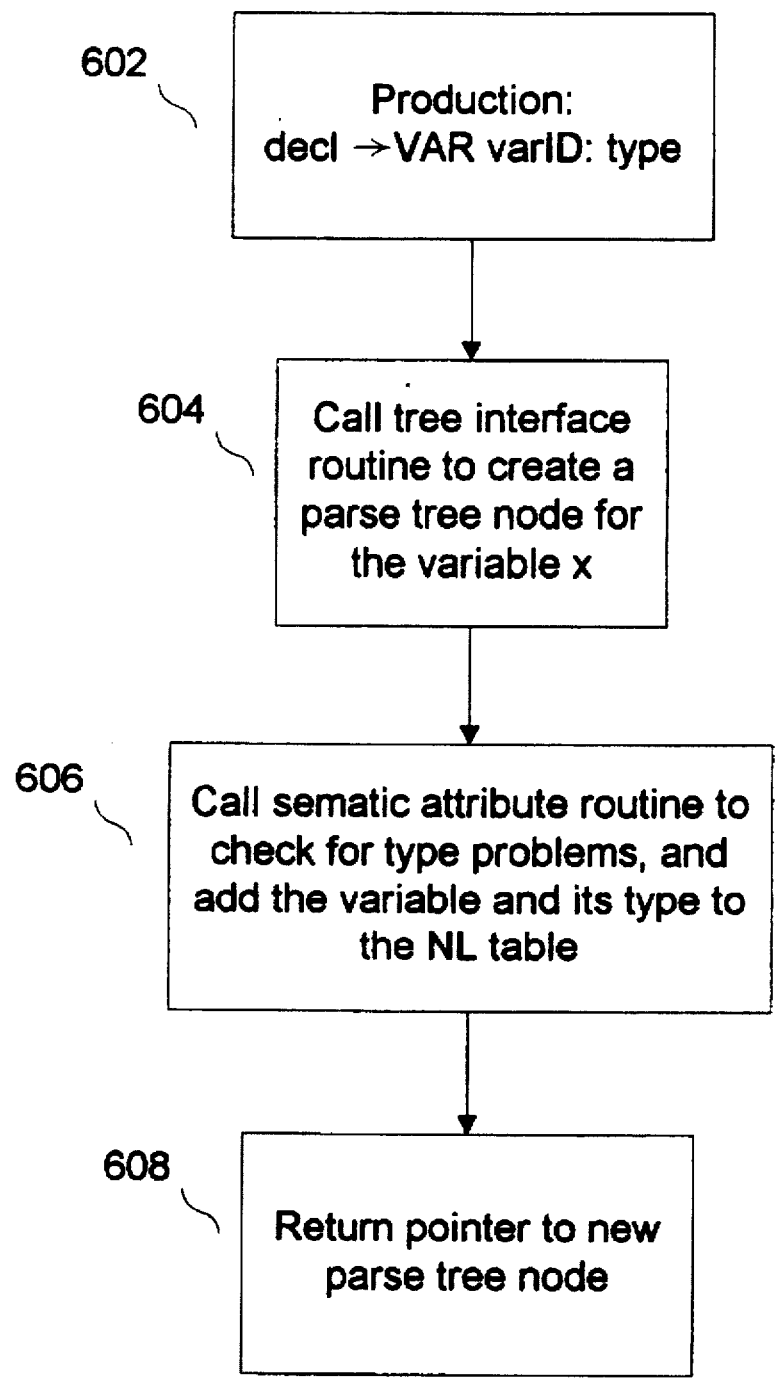
FIG. 6 shows a further example of the contents of the data structures of FIGS. 2(a)–2(b) during parse tree construction.
Figure 7:
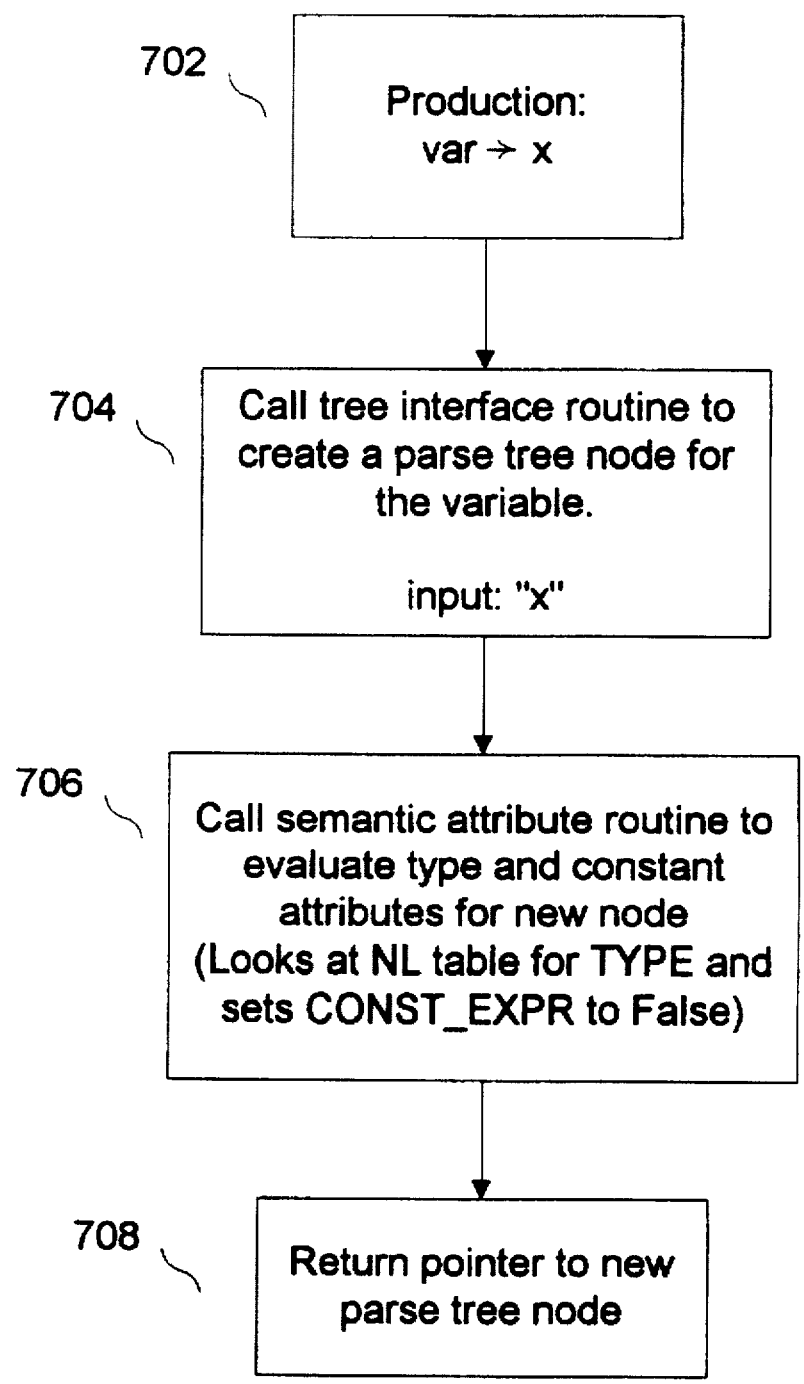
FIGS. 7–11 are flow charts showing steps performed during semantic analysis.
Figure 8:
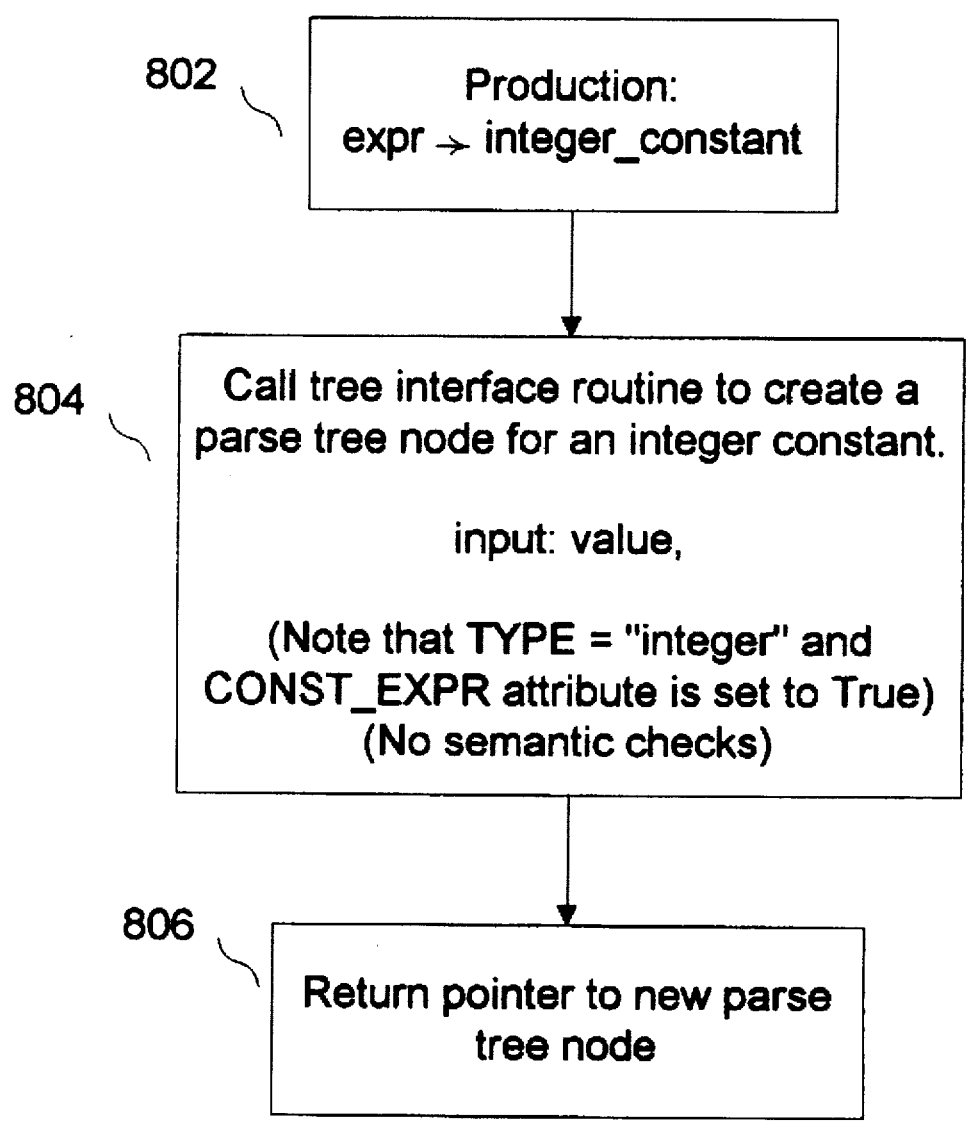
Figure 9:
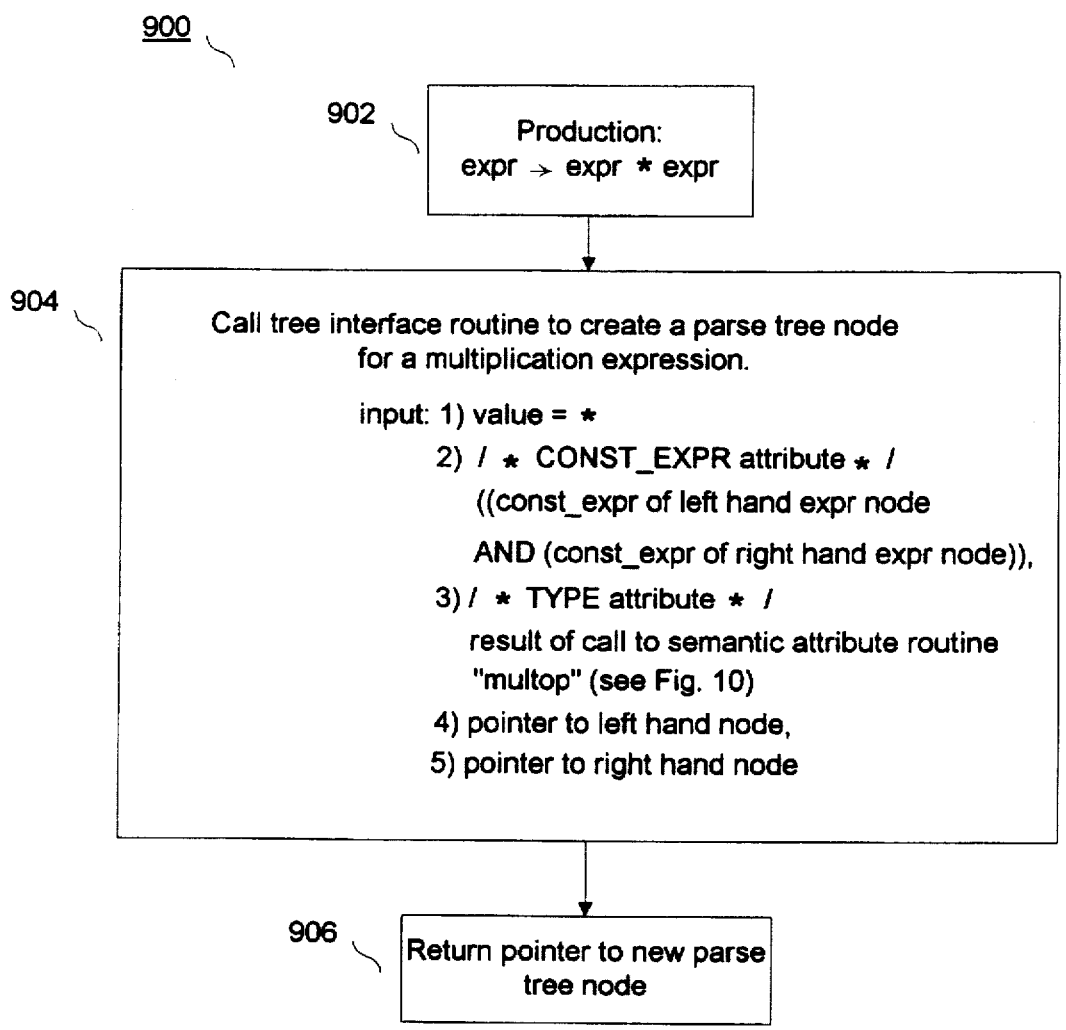
Figure 10:
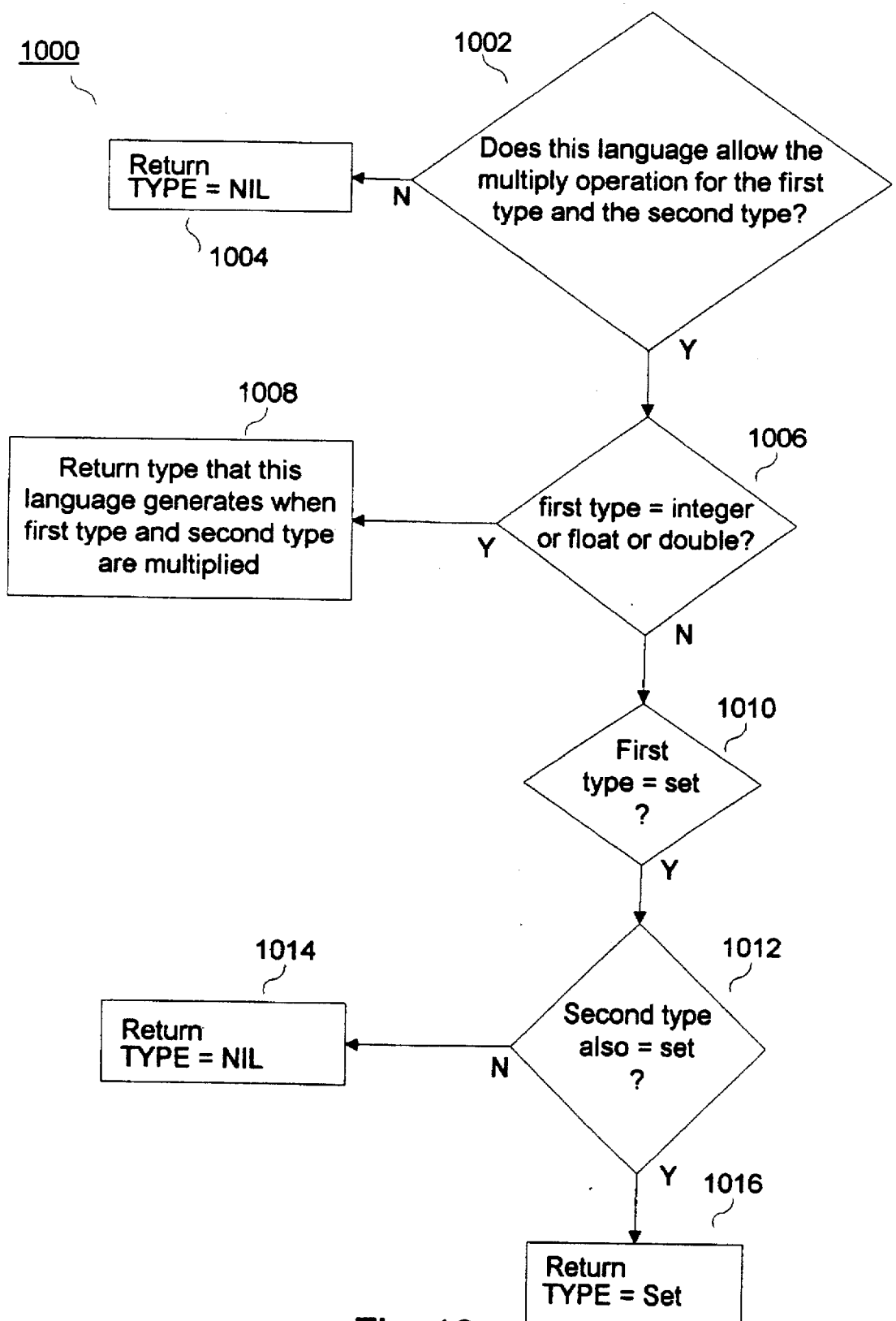
Figure 11:
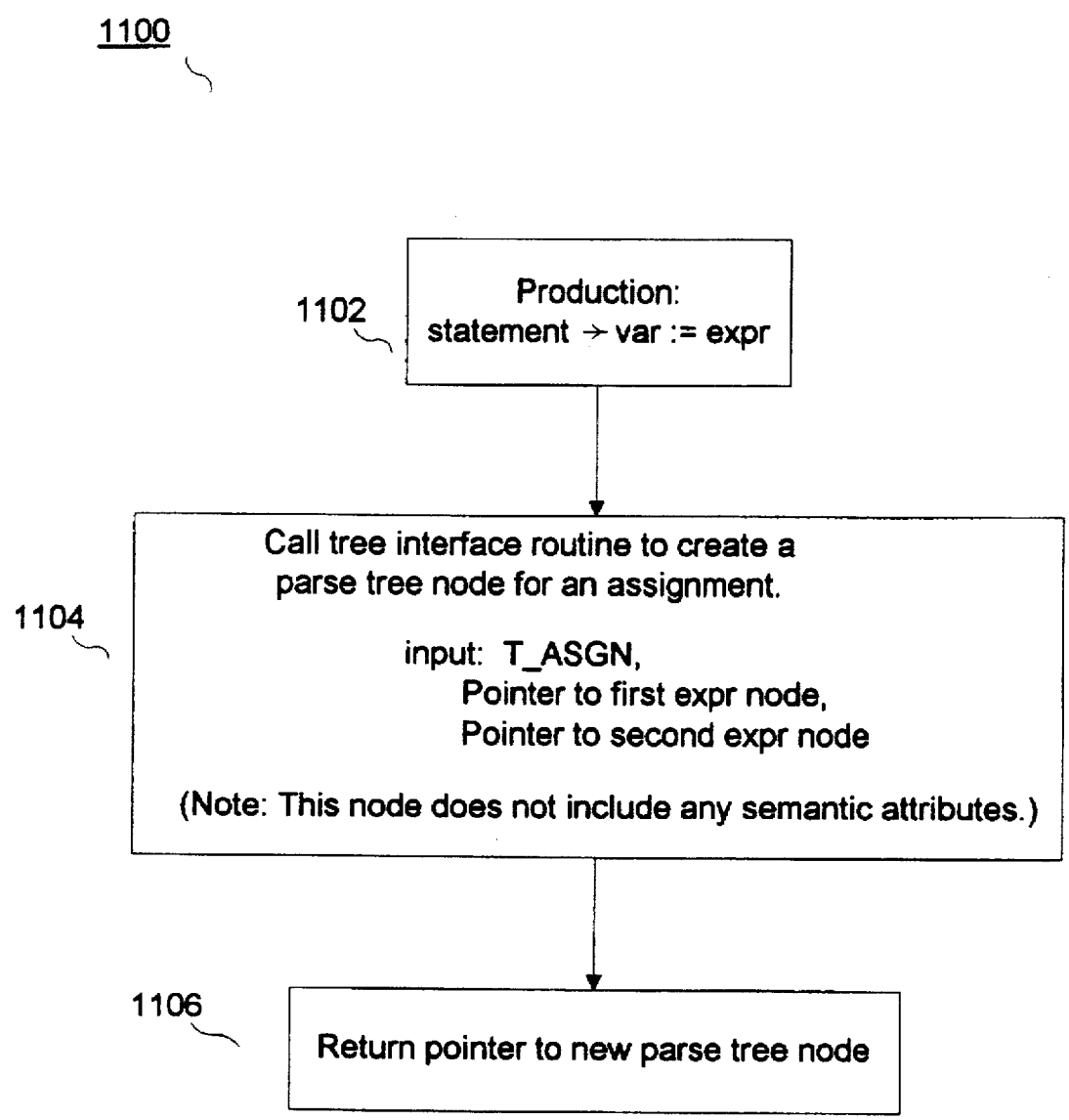

FIGS. 3 through 7 show an example of the creation and use of the data structures of FIG. 2 during compilation. It will be understood that the steps of FIGS. 3, 4, and 7 are embodied as computer instructions stored in memory 104 and executed by CPU 102. The following example uses the source program:

```
program p;
    var a: integer;
        b: real;         /* 1 */
    procedure q;
        var a: char;
            b: boolean;
        begin            /* 2 */
            a: = '*';
            b: = true;
        end;             /* 3 */
    begin
        a: = 0;
        b: = 1.0;
    end.
```

The following example shows the data structures at various point 1, 2, and 3, as shown in the comments of program p above.

FIGS. 3(a), 3(b), and 4 are flow charts showing steps performed to create the data structures of FIGS. 5 and 6. In a preferred embodiment, the steps of FIG. 3(a) are performed whenever a program block is entered. Similarly, in a preferred embodiment, the steps of FIG. 3(b) are performed whenever a program block is exited. The steps of FIG. 4 are performed when an identifier is declared or defined. In a multiple pass compiler of a first preferred embodiment, the steps are performed by syntactical analyzer 114. In a second preferred embodiment, the steps are performed by semantic analyzer 116, as discussed below.

FIGS. 5 and 6 show a display list 240. Each entry 250 in display list 240 corresponds to a block (also called a "level") in source program 110. In the example, program p represents a first level and procedure q represents a second level. Each entry in display list 240 points to a first entry and a last entry in a local definition list for the block. FIRST points to a first entry in the local definition list and LAST points to a last entry in the local definition list. Each local definition list is formed of entries linked by the NL_NXTLOC fields 238 of NL table 204.

The data structures of FIGS. 5 and 6 are initially created by syntactical analyzer 114 at the time it creates parse tree 133. In FIG. 3(a) when syntactical analyzer 114 enters a new block, the level ("L") is incremented (e.g., to a "one""1") in step 304 of FIG. 3(a). When it is first created, display list 240 is empty. A new local definition list is added for each new block entered in step 306. Each local definition list is initially empty. Elements are added to the local definition list as identifiers are declared within the corresponding block.

FIG. 4 is a flow chart showing additional steps performed to create the data structures of FIG. 2. The steps of FIG. 4 are performed when an identifier is declared or defined. When syntactical analyzer 114 encounters a new identifier declaration or definition (step 402) the syntactical analyzer performs the steps of FIG. 4 to create a new NL table entry for the identifier. The syntactical analyzer then adds the identifier to the local definition list for the current block.

In the following example, it is assumed that the syntactical analyzer is creating an NL table entry for the integer variable "a" of program p. In step 404, the syntactical analyzer creates an NL table entry 230 for "a" and stores an indication that "a" is a variable in field 232. The syntactical analyzer 114 also determines a pointer for "a", which identifies a corresponding entry in ID table 202. Here, there is no entry in ID table 202 for "a", so an entry 220 is created in step 408.

In step 410, because there was no entry in ID table 202 for "a", NL_PREV 236 is set to NIL. If there had been an entry for "a" in ID table 202, NL_PREV would have been set to the NL table entry for "a" in a higher block in step 414. The variable name "a" is stored in field 222 in step 412. In step 416, ID_NL pointer 224 is set to point to the new NL table entry 230.

Step 418 sets the NL_ID field 234 to point to the new ID table entry 220. Step 420 adds the NL table entry 230 to the local definition list and adjusts the FIRST and LAST fields of the current entry of display list 240 to point to the first and last fields of the local definition list. Step 422 returns a pointer to the newly created ID table field 220. The returned pointer is stored in field 212 of the appropriate parse tree node.

When syntactical analyzer 114 encounters a previously declared identifier, it stores a pointer to the appropriate ID table entry in field 212 of the parse tree (instead of storing the name of the identifier).

FIG. 5 shows the data structures at point /*1*/ in program p, after the integer identifier "a" and the real identifier "b" have been declared. The FIRST pointer of display list entry 250 points to the NL table entry 230 for "a". The LAST pointer points to the NL table entry 251 for "b". FIG. 6 shows the data structures at point /*2*/ in procedure q, after the character identifier "a" and the boolean identifier "b" have been declared. As shown in FIG. 6, once procedure q is entered, the current level ("L") becomes "2" and a new local definition list (pointed to by entry 251) is initialized for procedure q. After the steps of FIG. 4 are performed for the declarations of new identifiers "a" and "b" in procedure q, entries 220 and 221 in ID table 202 points to new Current Effective Definitions for "a" and "b". Thus, for example, at point /*2*/ in procedure q, parsing the declaration of identifier "a" modifies entry 220 in ID table 202 to point to entry 260 in NL table 204. Similarly, parsing a reference to an identifier "b" will lead to modifying entry 221 in ID table 202 to point to entry 261 in NL table 204.

At point /*2*/ in program p, the current NL table entry 260 for "a" points back to the "higher level" entry 230 for "a". Similarly, the current NL table entry 261 for "b" points back to the higher level entry 231 for "b".

At point /*3*/ in program p, the syntactical analyzer has just processed the source program code that exits from the block of procedure q and the steps of FIG. 3(b) are performed. In step 354, for each entry in the local definition list (as defined by FIRST and LAST pointers 251) each ID_NL field 224 of the corresponding ID Table is adjusted to point to either a higher block version of the variable (as indicated by the NL_PREV field 236) or to NIL. Step 356 decrements the current level pointer ("L") to point to entry 250. These steps have the effect of returning the data structures to the state shown in FIG. 5.

ID table 202, NL table 204, display list 240, and the plurality of local display lists are created by syntactical analyzer 114. Semantic analyzer 116 uses the data structures during semantic analysis to quickly access the NL table. During its operation, semantic analyzer 116 adjusts the level pointer L for display list 240 and the ID_NL fields 224 of ID table 202 as semantic analyzer 116 enters and exists blocks. The data structures do not have to be recreated during semantic analysis because the data created by the syntactical analyzer remains in the data structures.

FIG. 7 is a flow chart showing steps performed during semantic analysis in a first preferred embodiment of the present invention. The embodiment of FIG. 7 shows a multi-pass compiler in which semantic analysis is performed after syntactical analysis. When semantic analyzer 116 enters a new block of the source program in step 702, the display list level (L) is incremented in step 704 to point to a different local definition list (as formed by the NL_NXTLOC fields) of NL table 204. For each entry in the local definition list, the corresponding ID_NL field 224 of ID table 202 is adjusted to point to the local definition list entry in step 706. The result of steps 702 through 706 is that the appropriate ID_NL fields are adjusted to point to NL table entries for identifiers newly declared or defined within the block.

When semantic analyzer 116 encounters an identifier in parse tree 133 (step 708) it uses parse tree field 212 to point to ID table 202 to get the NL table entry for the identifier (step 710). The ID_NL field 224 in ID table 202 points to a Current Effective Definition in NL table 204 for the identifier. Thus, semantic analyzer 116 does not have to search NL table 204 for an identifier name. Furthermore, use of the ID NL field 224 in ID table 202 ensures that semantic analyzer 116 is accessing the correct version of the identifier if the identifier is declared several times in different blocks.

When semantic analyzer 116 exits a block of the source program in step 714 for each entry in the current local definition list, the corresponding ID_NL field 224 is adjusted in step 716 to point to a higher block entry (or to NIL), as described above in connection with FIG. 3(b). The display list level (L) is decremented in step 718. The result of steps 714 through 718 is that the appropriate ID_NL fields no longer point to identifiers declared or defined in the exited block.

In a second preferred embodiment of the invention, the compiler does not perform syntactical and semantic checking in separate passes. Instead, at least part of syntactical analysis (parsing) and semantic analysis are intermixed and CED fields are set/restored only once per block of source code. In this embodiment, for example, processing of an identifier "a" proceeds as follows, Syntactical analyzer 114 parses the declaration for "a" and creates its parse tree node. Semantic analyzer 116 creates a new NL entry for "a" and enters this NL entry into the current scope (i.e., sets the CED field of the id(a) to point to N, and updates the corresponding NL_PREV field to point to the previous scope of "a", if any). Semantic analysis is then performed on the declaration of "a". The CED setting to set up the new scope of "a" remaining unchanged until the end of the block or until a new definition of "a" occurs.

When, in the second embodiment, the syntactical analyzer 114 reaches the assignment statement, the scope of "a" is already set by the semantic analysis of the declaration, as described above. Semantic analyzer 116 uses the parse tree pointer and CED field to avoid having to search the NL table for "a" during semantic analysis of the assignment statement for "a". In the second embodiment, at the end of the procedure or block, semantic analyzer 116 restores all "old" CED references of the local identifiers.

Thus, in the second embodiment, steps 304 and 306 of FIG. 3(a), steps 354 and 356 of FIG. 3(h), and steps 404–422 of FIG. 4 are performed by semantic analyzer 116 operating in conjunction with syntactical analyzer 114. Because semantic analyzer 116 is not part of a separate pass, steps of FIG. 7 that determine when a block is entered and exited are not required in the second embodiment.

In one implementation of the second embodiment, the semantic analysis routines dealing with the CED pointers are a part of semantic routines included as actions in a grammar for the language being compiled. This implementation is discussed in the co-pending application of Safonov, Ser. No. 08/586,234 filed Mar. 22, 1996, entitled "Method and Apparatus for Efficient Evaluation of Semantic Attributes in LALR Parsing".

Other embodiments of the present invention will be apparent to those skilled in the art from consideration of the specification and practice of the invention disclosed herein.

Moreover, is will be apparent to persons of ordinary skill in the art that the present invention can be used in connection with a compiler for any high level language that uses an NL table (a symbol table). Although the invention has been described in connection with a conventional semantic analyzer, the invention may also be used in a compiler using semantic attributes as described in the co-pending application Ser. No. 08/586,234 entitled "Method and Apparatus for Efficient Evaluation of Semantic Attributes in LALR Parsing" of V. O. Safonov, filed on Mar. 22, 1996 which is incorporated herein by reference. It is intended that the specification and examples be considered as exemplary only, with a true scope of the invention being indicated by the following claims.

What is claimed is:

1. A method of compiling a source program, comprising the steps, performed by a data processing system having a memory, of:

inputting the source program;

generating a parse tree node for the source program in the memory;

storing in the parse tree node a pointer into an ID table in memory that contains a pointer to an NL table entry for an identifier in the source program; and performing a semantic analysis of the source program using the pointer stored in the parse tree node to access the NL table entry for the identifier.

2. A method of constructing a parse tree by a compiler that inputs a source program, comprising the steps performed by a data processing system having a memory, of:

determining when a new block of the source program is entered;

constructing a new local definition list for the new block in the memory;

determining when an identifier is declared in the source program;

adding a new entry to an NL table in the memory for the identifier;

constructing in the memory a parse tree node having an indirect pointer to the new NL table entry; and adding the new NL table entry to the new local definition list.

3. The method of claim 2, further including the steps of determining when a block of the source program is exited, and decrementing a level indicator so that the new local definition list is inactive.

4. The method of claim 2, further comprising the steps of:

constructing a new ID table entry including a Current Effective Definition pointer that points to the new NL table entry, and wherein the step of constructing a parse tree node includes the step of constructing a parse tree node having a pointer to the new ID table entry.

5. The method of claim 4, further comprising the step of changing a current Effective Definition Pointer in an existing ID table entry to point to the new NL table when a block is entered.

6. The method of claim 1, wherein the storing step is performed by a syntactical analyzer in a multi-pass compiler.

7. The method of claim 1, wherein the storing step and the performing step are performed by a semantic analyzer portion of a compiler.

8. An apparatus to compile a source program, comprising:

a memory provided to store at least the source program and an ID table and an NL table having an NL table entry;

a parse tree generator provided to generate a parse tree node in the memory for the source program;

a pointer portion provided to store in the parse tree node a pointer into the ID table in memory that contains a pointer to the NL table entry for an identifier in the source program; and a semantic analyzer provided to perform a semantic analysis of the source program using the pointer stored in the parse tree node.

9. A compiler that constructs a parse tree in a memory for a source program stored in the memory, comprising:

a first parser portion provided to determine when a new block of the source program is entered;

a second parser portion provided to construct a new local definition list for the new block in the memory;

a third parser portion provided to determine when an identifier is declared in the source program;

a fourth parser portion provided to add a new entry to an NL table in the memory for the identifier;

a fifth parser portion provided to construct in the memory a parse tree node having an indirect pointer to the new NL table entry; and a sixth parser portion provided to add the new NL table entry to the new local definition list.

10. The compiler of claim 9, further comprising a seventh parser portion provided to determine when a block of the source program is exited, and to decrement a level indicator so that the new local definition list is inactive.

11. The compiler of claim 9, further comprising:

a seventh parser portion provided to construct a new ID table entry including a Current Effective Definition pointer that points to the new NL table entry, and wherein the fifth parser portion includes a portion provided to construct a parse tree node having a pointer to the new ID table entry.

12. The compiler of claim 9, further comprising a seventh parser portion provided to change a current Effective Definition Pointer in an existing ID table entry to point to the new NL table when a block is entered.

* * * * *